United States Patent
Voronel

(10) Patent No.: US 9,678,534 B2
(45) Date of Patent: Jun. 13, 2017

(54) CONVERTIBLE CLAMSHELL TO SLATE DEVICE

(75) Inventor: Gary Voronel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/351,241

(22) Filed: Jan. 17, 2012

(65) Prior Publication Data
US 2013/0181909 A1     Jul. 18, 2013

(51) Int. Cl.
G06F 3/041     (2006.01)
G06F 1/16      (2006.01)

(52) U.S. Cl.
CPC .......... G06F 1/1618 (2013.01); G06F 1/1662 (2013.01)

(58) Field of Classification Search
USPC ............ 345/168, 172, 173; 16/354; 361/682
See application file for complete search history.

(56) References Cited

U.S. PATENT DOCUMENTS

| | | | |
|---|---|---|---|
| 5,548,478 A | 8/1996 | Kumar et al. | |
| 5,987,704 A * | 11/1999 | Tang | G06F 1/1681 16/342 |
| 6,243,258 B1 * | 6/2001 | Paratore | G06F 1/1618 345/168 |
| 6,771,494 B2 | 8/2004 | Shimano | |
| 6,903,927 B2 * | 6/2005 | Anlauff | G06F 1/162 341/22 |
| 7,345,872 B2 * | 3/2008 | Wang | G06F 1/1618 16/354 |
| 7,619,879 B2 | 11/2009 | Aoyama et al. | |
| 7,623,121 B2 | 11/2009 | Dodge | |
| 2003/0112590 A1 * | 6/2003 | Shimano | G06F 1/162 361/679.06 |
| 2004/0114315 A1 | 6/2004 | Anlauff | |
| 2005/0243504 A1 | 11/2005 | Wong et al. | |

(Continued)

FOREIGN PATENT DOCUMENTS

EP     2284646 A1 *    2/2011
JP     2000010713 A    1/2000

(Continued)

OTHER PUBLICATIONS

Hinckley et al., "Codex: A Dual Screen Tablet Computer", Retrieved at <<http://www.dgp.utoronto.ca/~ravin/papers/chi2009_codex.pdf>>, Computer-Human Interaction (CHI) Conferece, Apr. 9, 2009, pp. 1933-1942.

(Continued)

*Primary Examiner* — Kent Chang
*Assistant Examiner* — Mark Edwards
(74) *Attorney, Agent, or Firm* — Qudus Olaniran; Judy Yee; Micky Minhas

(57) ABSTRACT

In one embodiment, a clamshell-slate hybrid may act as either a clamshell or slate computing device. The clamshell-slate hybrid 202 may selectively set an activation state of a vestigial key set 426 of a keyboard 424 on a key side 422 of a keyboard chassis 206 hinged along a top axis to a display chassis 204. The clamshell-slate hybrid 202 may retract the vestigial key set 426 based on an activation state. The clamshell-slate hybrid 202 may receive a user input in a touch screen display 354 on a display side 352 of the display chassis 204.

20 Claims, 8 Drawing Sheets

(56) References Cited

U.S. PATENT DOCUMENTS

| | | | | |
|---|---|---|---|---|
| 2005/0261040 | A1* | 11/2005 | Andersson | H04M 1/0218 455/575.3 |
| 2006/0203014 | A1 | 9/2006 | Lev et al. | |
| 2006/0238439 | A1* | 10/2006 | Fuller | G06F 1/1601 345/1.1 |
| 2007/0214393 | A1* | 9/2007 | Cox | G06F 3/023 714/47.1 |
| 2008/0316691 | A1 | 12/2008 | Arends | |
| 2009/0231791 | A1 | 9/2009 | Aoyama et al. | |
| 2009/0244012 | A1 | 10/2009 | Behar et al. | |
| 2010/0035665 | A1* | 2/2010 | Munson | G06F 1/1624 455/575.1 |
| 2010/0295794 | A1 | 11/2010 | Russ et al. | |
| 2011/0170250 | A1* | 7/2011 | Bhutani | G06F 1/1666 361/679.2 |
| 2011/0222238 | A1 | 9/2011 | Staats et al. | |
| 2011/0234498 | A1* | 9/2011 | Gray | G06F 3/016 345/168 |
| 2011/0304550 | A1* | 12/2011 | Romera | G06F 3/016 345/168 |
| 2013/0088431 | A1* | 4/2013 | Ballagas | G06F 1/1626 345/168 |

FOREIGN PATENT DOCUMENTS

| | | |
|---|---|---|
| JP | 2002258982 A | 9/2002 |
| JP | 2004240495 A | 8/2004 |

OTHER PUBLICATIONS

"International Search Report", Mailed Date: May 1, 2013, Application No. PCT/US2013/021586, Filed Date: Jan. 14, 2013, pp. 10.

"Third Office Action Issued in Chinese Patent Application No. 201310016949.6", Mailed Date: Jul. 5, 2016, 12 Pages.

"Second Office Action and Search Report Issued in Chinese Patent Application No. 201310016949.6", Mailed Date: Jan. 12, 2016, 19 Pages.

"First Office Action and Search Report Issued in Chinese Patent Application No. 201310016949.6", Mailed Date: Jun. 2, 2015, 13 Pages.

"Extended European Search Report Issued in European Patent Application No. 13738487.1", Mailed Date: Jul. 31, 2015, 8 Pages.

"Office Action Issued in Japanese Patent Application No. 2014-552381", Mailed Date: Oct. 18, 2016, 4 Pages. (w/o English Translation).

"Office Action Issued in Chinese Patent Application No. 201310016949.6", Mailed Date: Jan. 11, 2017, 11 Pages.

* cited by examiner

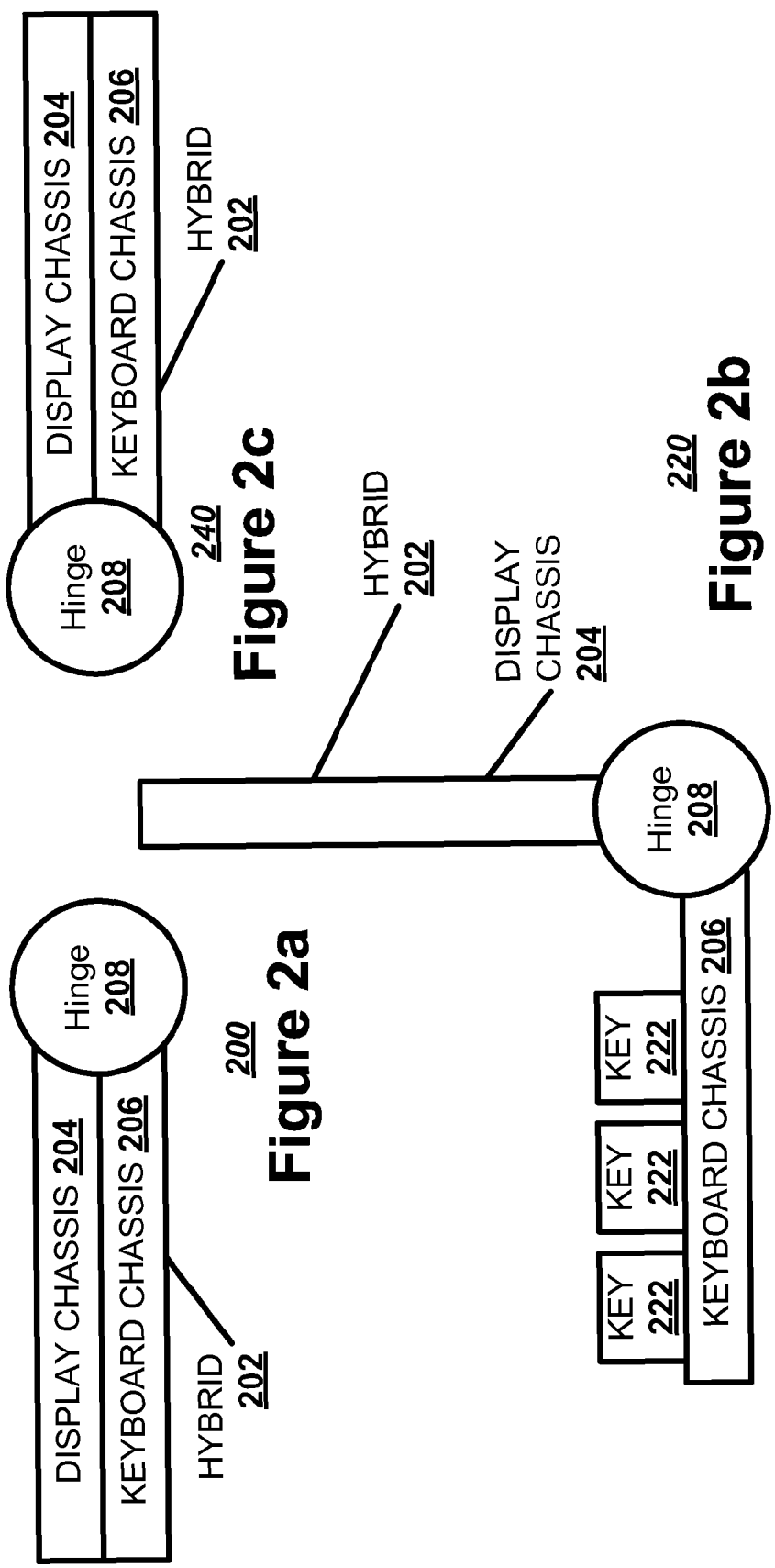

```
┌─────────────────────────────────────┐
│     TOP AXIS HINGE 408              │
├─────────────────────────────────────┤
│                                     │
│         BASE SIDE 402               │
│      ┌──────────────────┐           │
│      │  SENSOR 406      │           │
│      ├──────────────────┤           │
│      │  LATCH 404       │           │
│      └──────────────────┘           │
└─────────────────────────────────────┘
                                 400
                            Figure 4a
```

```
┌─────────────────────────────────────┐
│     TOP AXIS HINGE 408              │
├─────────────────────────────────────┤
│         KEY SIDE 422                │
│  ┌───────────────────────────────┐  │
│  │        KEYBOARD 424           │  │
│  │ ┌──────┬──────────┬────────┐  │  │
│  │ │DUAL  │VESTIGIAL │DUAL USE│  │  │
│  │ │USE   │KEY SET   │KEY SET │  │  │
│  │ │KEY   │  426     │  428   │  │  │
│  │ │SET   │          │        │  │  │
│  │ │ 428  │          │        │  │  │
│  │ └──────┴──────────┴────────┘  │  │
│  │       TOUCHPAD 430            │  │
│  └───────────────────────────────┘  │
└─────────────────────────────────────┘
                                 420
                            Figure 4b
```

```
┌─────────────────────────────────────┐
│     TOP AXIS HINGE 408              │
├─────────────────────────────────────┤
│         KEY SIDE 422                │
│  ┌───────────────────────────────┐  │
│  │        KEYBOARD 424           │  │
│  │ ┌──────┬──────────┬────────┐  │  │
│  │ │DUAL  │          │DUAL USE│  │  │
│  │ │USE   │ COVER 442│KEY SET │  │  │
│  │ │KEY   │          │  428   │  │  │
│  │ │SET   │          │        │  │  │
│  │ │ 428  │          │        │  │  │
│  │ └──────┴──────────┴────────┘  │  │
│  │       TOUCHPAD 430            │  │
│  └───────────────────────────────┘  │
└─────────────────────────────────────┘
                                 440
                            Figure 4c
```

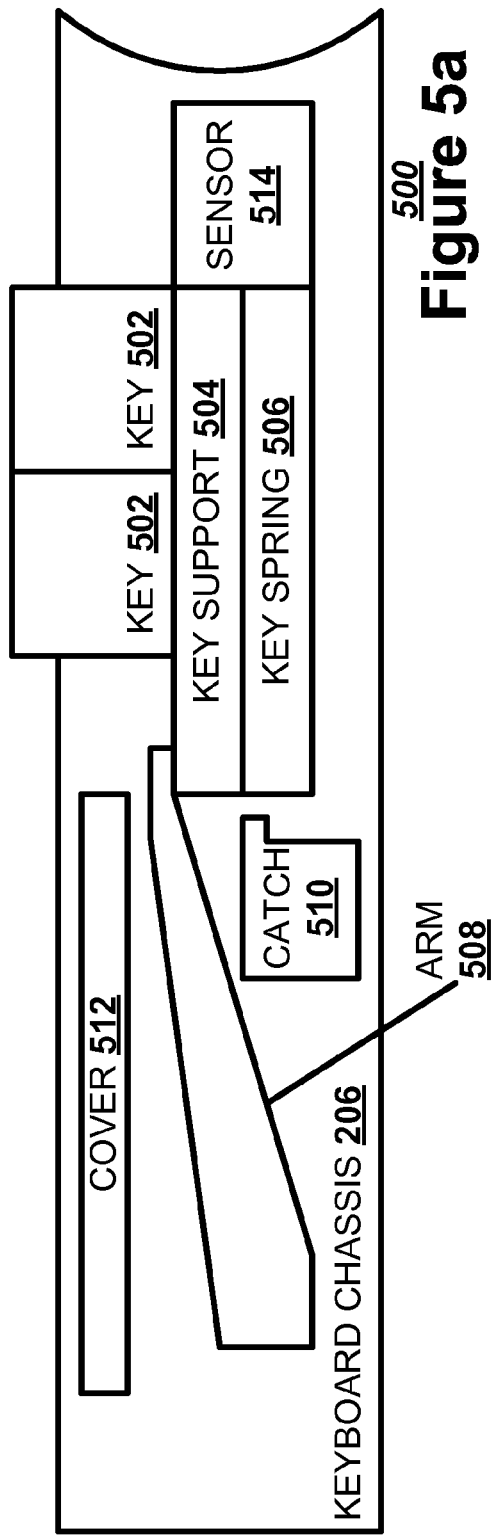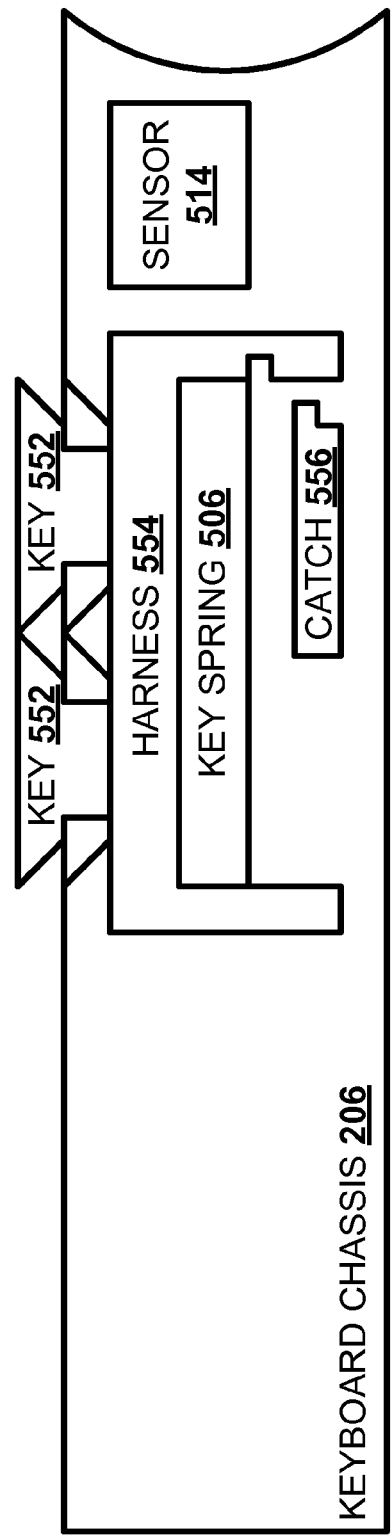
Figure 5a
Figure 5b

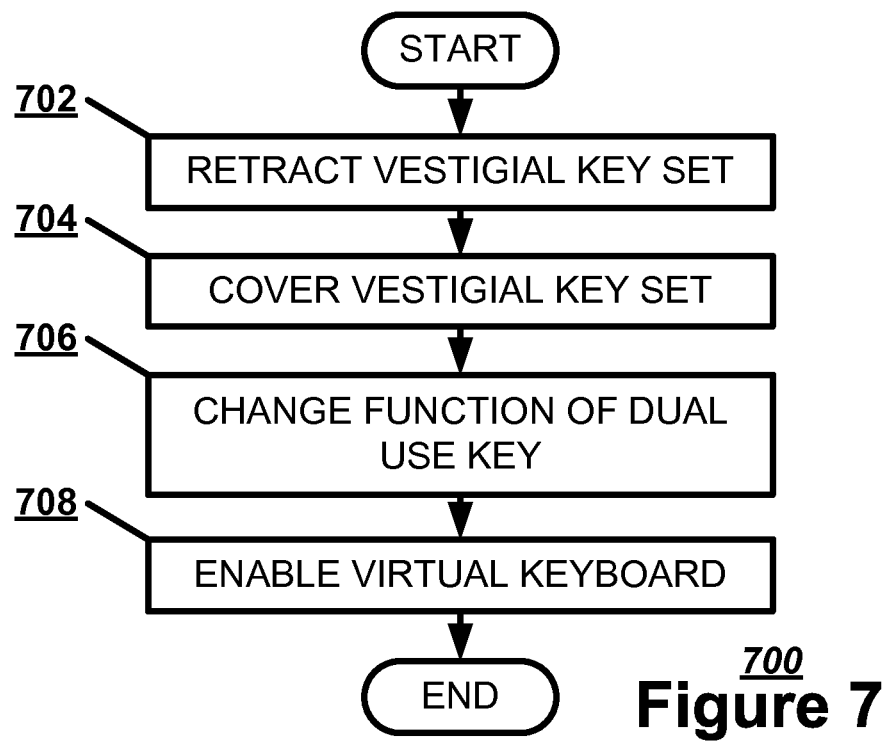
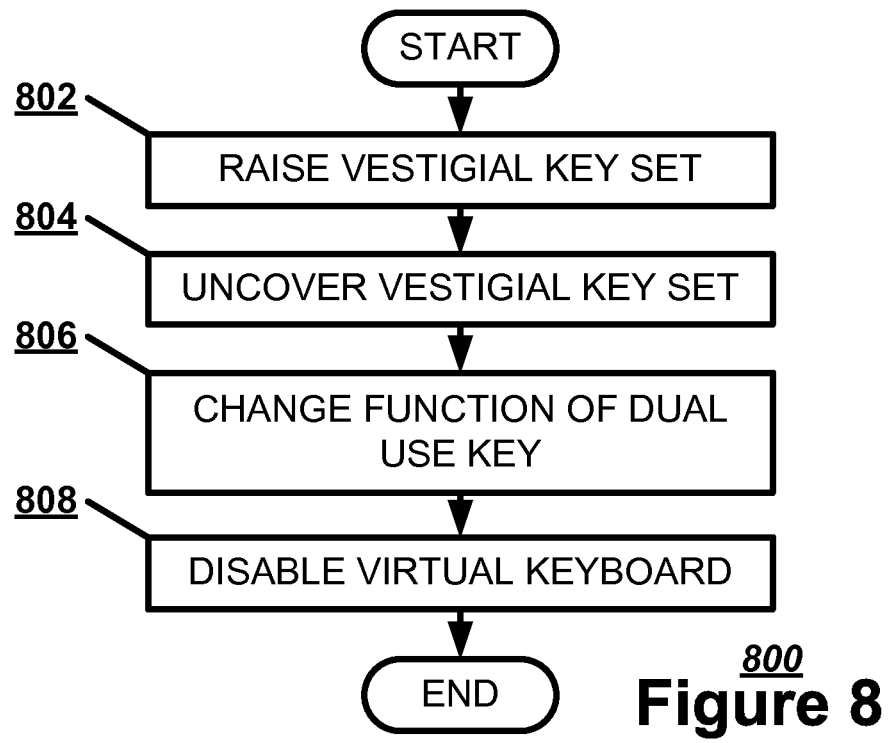

CONVERTIBLE CLAMSHELL TO SLATE DEVICE

BACKGROUND

Computers have evolved from giant room-sized servers to desktop devices, to laptops, to tablets, and to handheld computer devices. While laptops and tablets both offer portability, each may provide a different value for the user. A tablet may offer a more intuitive computing experience, while a laptop may produce an easier document creating experience.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a clamshell-slate hybrid acting as either a clamshell or slate computing device. The clamshell-slate hybrid may set selectively an activation state of a vestigial key set of a keyboard on a key side of a keyboard chassis hinged along a top axis to a display chassis. The clamshell-slate hybrid may retract the vestigial key set based on an activation state. The clamshell-slate hybrid may receive a user input in a touch screen display on a display side of the display chassis.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates, in a block diagram, one embodiment of a computing device.

FIGS. 2a-c illustrate, in block diagrams, multiple modes of one embodiment of a clamshell-slate hybrid.

FIGS. 3a-b illustrate, in block diagrams, multiple views of one embodiment of a display chassis.

FIGS. 4a-c illustrate, in block diagrams, multiple views of one embodiment of a keyboard chassis.

FIGS. 5a-b illustrate, in block diagrams, a cross section view of multiple embodiments of a retractor.

FIG. 7 illustrates, in a flowchart, one embodiment of a method of deactivating a keyboard.

FIG. 8 illustrates, in a flowchart, one embodiment of a method of activating a keyboard.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a laptop-slate hybrid.

A clamshell-slate hybrid may allow a computing device to have both a clamshell form factor and a slate form factor. A clamshell form factor has two similarly shaped component bodies that fold together along a hinge. A slate form factor has a single block component body. A clamshell-slate hybrid may describe both a laptop-tablet hybrid and a handheld computer device having both clamshell and slate form factors.

A clamshell-slate hybrid may have a hinge that allows a display chassis to rotate completely around a keyboard chassis and lock into place with the keyboard of the keyboard chassis and the display of the display chassis facing outward. As the display chassis locks into place, the keys of the keyboard chassis may retract to be flush with the chassis, giving the device a slate form factor. Selective keys in the keyboard may be set to a deactivated state to avoid accidental user input. Selected keys may change function in the slate state as opposed to the clamshell state. These selected keys may allow the clamshell-slate hybrid to be used as a controller, either as a game controller or a remote controller. Additionally, the display chassis may have a touch screen. The user interface may adapt depending on the mode of the clamshell-slate hybrid.

Thus, in one embodiment, a clamshell-slate hybrid may act as either a clamshell or slate computing device. The clamshell-slate hybrid may set an activation state selectively of a vestigial key set of a keyboard on a key side of a keyboard chassis hinged along a top axis to a display chassis. The clamshell-slate hybrid may retract the vestigial key set based on an activation state. The clamshell-slate hybrid may receive a user input in a touch screen display on a display side of the display chassis.

Figure 1:
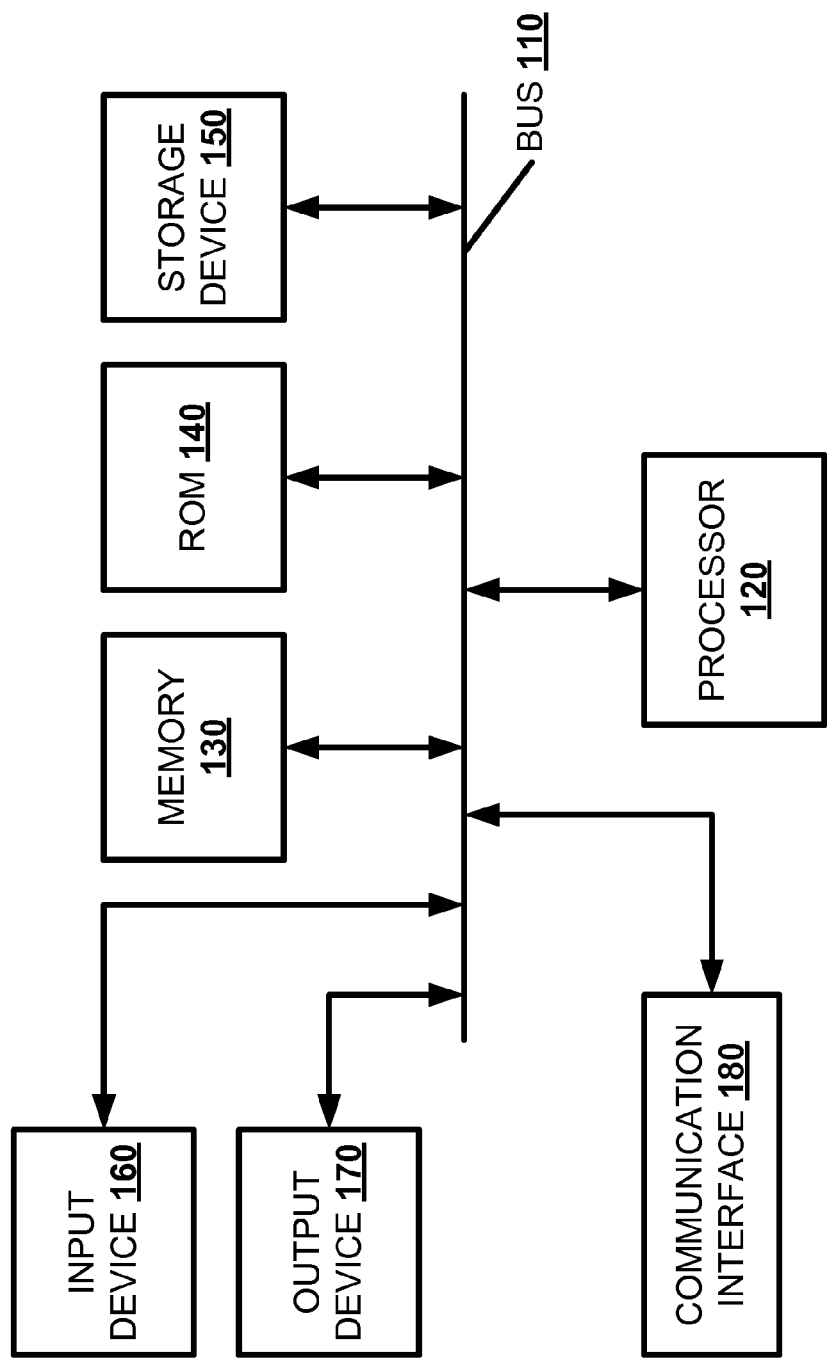

FIG. 1 illustrates a block diagram of an exemplary computing device 100 which may perform the user interface functions of a laptop-slate hybrid. The computing device 100 may combine one or more of hardware, software, firmware, and system-on-a-chip technology to implement the user interface functions of a laptop-slate hybrid. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. A tangible machine-readable medium is a physical medium storing machine-readable code or instructions, as opposed to a transitory medium or signal. The storage device 150 may store a set of instructions detailing a method that when executed by one or more processors cause the one or more processors to perform the method.

The input device 160 may include one or more conventional mechanisms that permit a user to input information to the computing device 100, such as a keyboard, a mouse, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables computing device 100 to communicate with other devices or networks. The communication interface 180 may include a network interface or a mobile transceiver interface. The communication interface 180 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

FIG. 2a illustrates, in a block diagram, one embodiment of a dormant mode 200 of a clamshell-slate hybrid 202. A clamshell computing device has two similar component bodies that fold together along a hinge. A clamshell computing device may have a display chassis 204 containing a visual display and a keyboard chassis 206 containing a keyboard to receive user input. A hinge 208 may connect the display chassis 204 to the keyboard chassis 206. A clamshell computing device may be a laptop computer or a clamshell handheld computer.

A slate computing device has a single block component body. The display in a slate computing device may be a touch screen display that receives user input. A slate computing device may be a tablet computer or a slate handheld computer.

A clamshell-slate hybrid 202 may act as either a clamshell computing device or a slate computing device. The clamshell-slate hybrid 202 may have a hinge 208 that allows the display chassis to rotate 360 degrees around the keyboard chassis. The hinge 208 may have multiple axes to allow complete rotation.

The clamshell-hybrid 202 may be turned off or in sleep mode when in dormant mode 200. In the dormant mode 200, the display chassis 204 of the clamshell-slate hybrid 202 may lay over top the keyboard chassis 206. The display in the display chassis 204 may face the keyboard in the keyboard chassis 206, so that the outer side of the display chassis 204 and the outer side of the keyboard chassis 206 may protect the display and keyboard.

FIG. 2b illustrates, in a block diagram, one embodiment of a clamshell mode 220 of a clamshell-slate hybrid 202. In the clamshell mode 220, the display chassis 204 may form an angle with the keyboard chassis 206 at the hinge 208 ranging from greater than 1 degree to less than 360 degrees. The clamshell-slate hybrid 202 may extend a set of keys 222 from the keyboard of the keyboard chassis 206. The keyboard chassis 206 may also support a touchpad and other input devices. A user may enter data into the clamshell-slate hybrid 202 using the keyboard, touchpad, and other input devices of the keyboard chassis 206.

FIG. 2c illustrates, in a block diagram, one embodiment of a slate mode 240 of a clamshell-slate hybrid 202. In the slate mode 240, the display chassis 204 may lay atop the keyboard chassis 206 with the outer side of the display chassis 204 facing the outer side of the keyboard chassis 206. Thus, keyboard and the display both face out. The clamshell-slate hybrid 202 may retract and deactivate the set of keys 222 from the keyboard of the keyboard chassis 206.

Figure 3A:
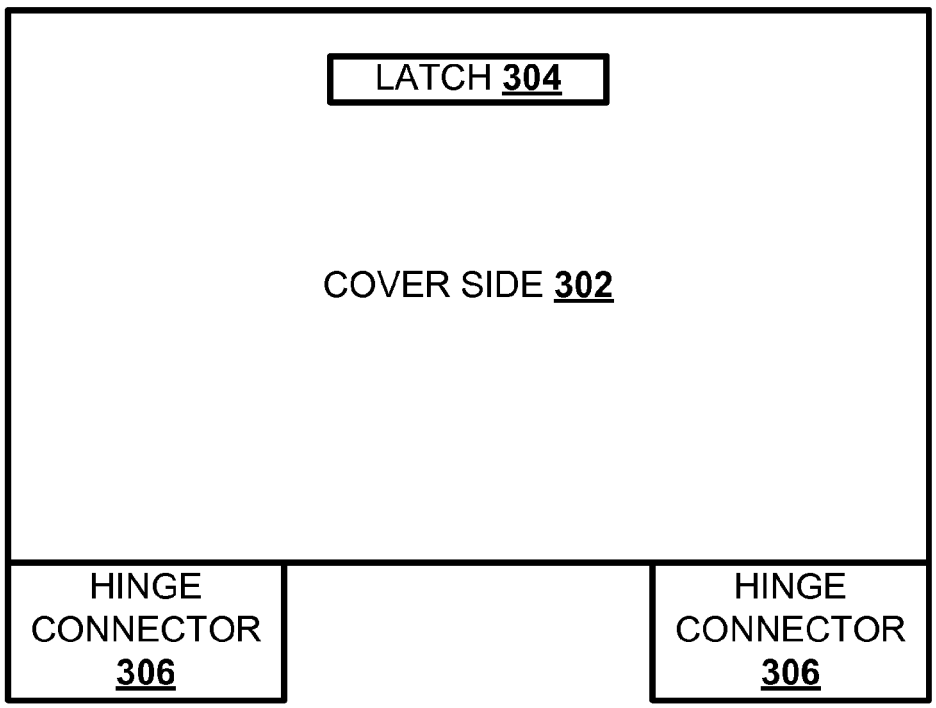

FIG. 3a illustrates, in a block diagram, a rear view 300 of one embodiment of a display chassis 204. The display chassis 204 may have a cover side 302 opposite the display. The cover side 302 may have a cover latch 304 that attaches to the side of the keyboard chassis 206 opposite the keyboard. The cover latch 304 may be a magnetic cover latch, a retractable hook, or other type of cover latch 304 to hold the display chassis 204 solidly in position with the keyboard chassis 206. The display chassis 204 may have a hinge connector 306 attaching the display chassis 204 to the hinge 208.

Figure 3B:
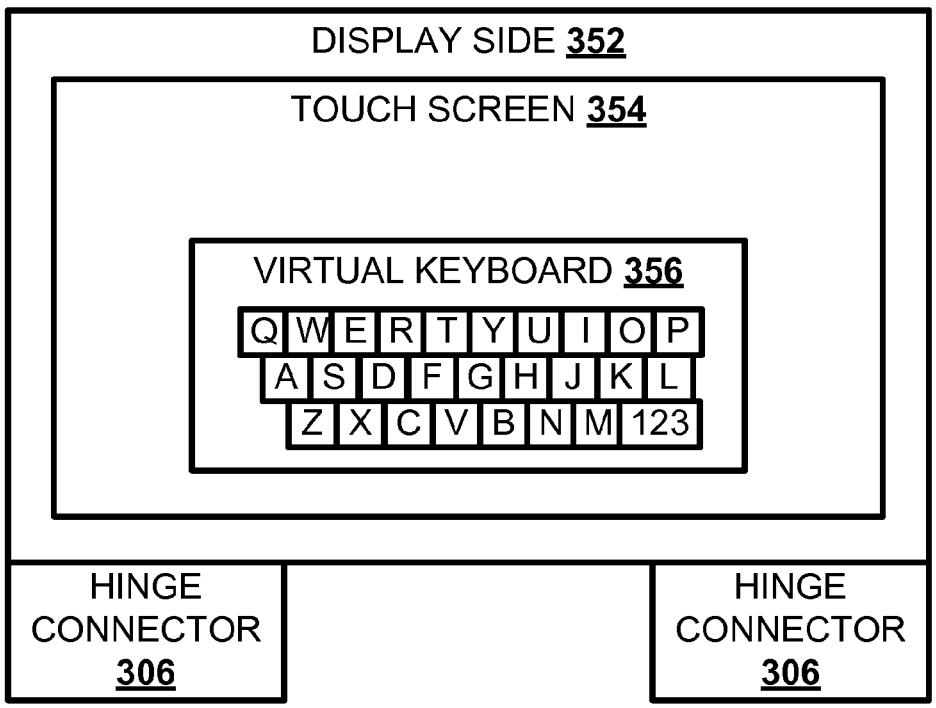

FIG. 3b illustrates, in a block diagram, a front view 350 of one embodiment of a display chassis 204. The display chassis 204 may have a display side 352 presenting a touch screen display 354. The touch screen display 354 may receive a user input. The touch screen display 354 may disregard touch inputs based on the position of the display chassis 204 relative to the keyboard chassis 206. The touch screen display 354 may present a popup virtual keyboard 356 based on whether the keyboard is in an active state. A popup virtual keyboard is a touch screen keyboard that is selectively presented to the user based on the content of the screen. For example, if the touch screen display 354 is presenting a form to be filled with text, the popup virtual keyboard may appear for the user to enter text.

FIG. 4a illustrates, in a block diagram, a rear view 400 of one embodiment of a keyboard chassis 206. The keyboard chassis 206 may have a base side 402 opposite the keyboard. The base side 402 may have a base latch 404 for connecting to the cover latch 304 from the cover side 302 of the display chassis 204. The base latch 404 may have a latch sensor 406 for detecting if the cover latch 304 is connected to the base latch 404. The base latch 404 and the cover latch 304 may be magnetic with a built in latch sensor 406. The latch sensor 406 may determine when the magnetic cover latch 304 and the magnetic base latch 404 create a closed circuit. The keyboard chassis 206 may have a top axis hinge 408. Alternately, the latch sensor 406 may be based at the top axis hinge 408. A top axis hinge 408 is a hinge 208 near the top edge of the keyboard chassis 206 that allows the keyboard chassis 206 to rotate around the top edge.

FIG. 4b illustrates, in a block diagram, a front active view 420 of one embodiment of the keyboard chassis 206. The keyboard chassis 206 may have a key side 422 containing a keyboard 424. The keyboard 424 may have a vestigial key set 426 and a dual use key set 428. The vestigial key set 426 may have a vestigial key or multiple vestigial keys. The vestigial key set 426 may have an activation state. The activation state may be an active state or a deactivated state. In an active state, a vestigial key may register being pressed by the user. In a deactivated state, a vestigial key may disregard being pressed by the user.

The dual use key set 426 may have a dual use key or multiple dual use keys. The dual use key set 428 may have different functions based on the display position of the display chassis 204 relative to the keyboard chassis 206. Additionally, the dual use key set 428 may have a first function when the vestigial key set 426 is in an active state and may have a different function when the vestigial key set 426 is in a deactivated state. The dual use key set 428 may act as part of a standard key board while the vestigial key set 426 is in an active state. The dual use key set 428 may act as part of a controller, such as a game controller or a remote control, while the vestigial key set 426 is in a deactivated state. The dual use key set 428 may be placed in an active state or a deactivated state coinciding with the vestigial key set based on a setting of the clamshell-slate hybrid 202. For example, the clamshell-slate hybrid 202 may have both a controller setting and a tablet setting while in slate mode 240.

The key side 422 may contain a touchpad 430 that acts as a mouse. The touchpad 430 may be in an active state or a deactivated state. The activation state of the touchpad 430 may be connected to the activation state of the vestigial key set 426 or may be independent of the activation state of the vestigial key set 426.

FIG. 4c illustrates, in a block diagram, a front dormant view 440 of one embodiment of the keyboard chassis 206. In a deactivated state, the vestigial key set 426 may disregard being pressed by the user. Further, a cover 442 may slide into place to protect the vestigial key set 426 when not in use. Alternately, the cover 442 may flip over onto the vestigial key set 426 or may snap into place.

A retractor may lower a vestigial key set 426 of the keyboard 424 based on an activation state. FIG. 5a illustrates, in a block diagram, a cross section view of one embodiment of a covered retractor 500 for the keyboard chassis 206. The keyboard chassis 206 may have a set of block keys 502 held in place by a key support 504. A key spring 506 may keep each block key 502 raised above the surface of the keyboard chassis 206. An arm 508 may lower the block keys 502 below the surface of the keyboard chassis 206. The covered retractor 500 may use other retraction mechanisms besides an arm 508 to lower the block keys 502. A support catch 510 may hold the block keys 502 in the retracted state. A cover 512 may be slide over a vestigial key set 426 of block keys 502 to protect the block keys 502 in the retracted state. A hinge sensor 514 at the hinge 208 may determine the position of the keyboard chassis 206 relative to the display chassis 204. The retraction state of the block keys 502 may be set based on the position of the keyboard chassis 206 relative to the display chassis 204.

FIG. 5b illustrates, in a block diagram, a cross section view of one embodiment of a coverless retractor 550 for the keyboard chassis 206. The keyboard chassis 206 may have a set of fitted keys 552 held in place by a harness 554. The key spring 506 may keep each fitted key 552 raised above the surface of the keyboard chassis 206. The harness 554 may lower the fitted keys 552 to minimize any vestigial key gap between the fitted keys 552 and the keyboard chassis 206 upon retraction. The harness 554 may be pulled down by a mechanism or a magnetic source. The coverless retractor 550 may use other retraction mechanisms besides a harness 554 to lower the fitted keys 552. A harness catch 556 may hold the fitted keys 552 in the retracted state. The hinge sensor 514 may determine the position of the keyboard chassis 206 relative to the display chassis 204. The retraction state of the fitted keys 552 may be set based on the position of the keyboard chassis 206 relative to the display chassis 204.

Figure 6:
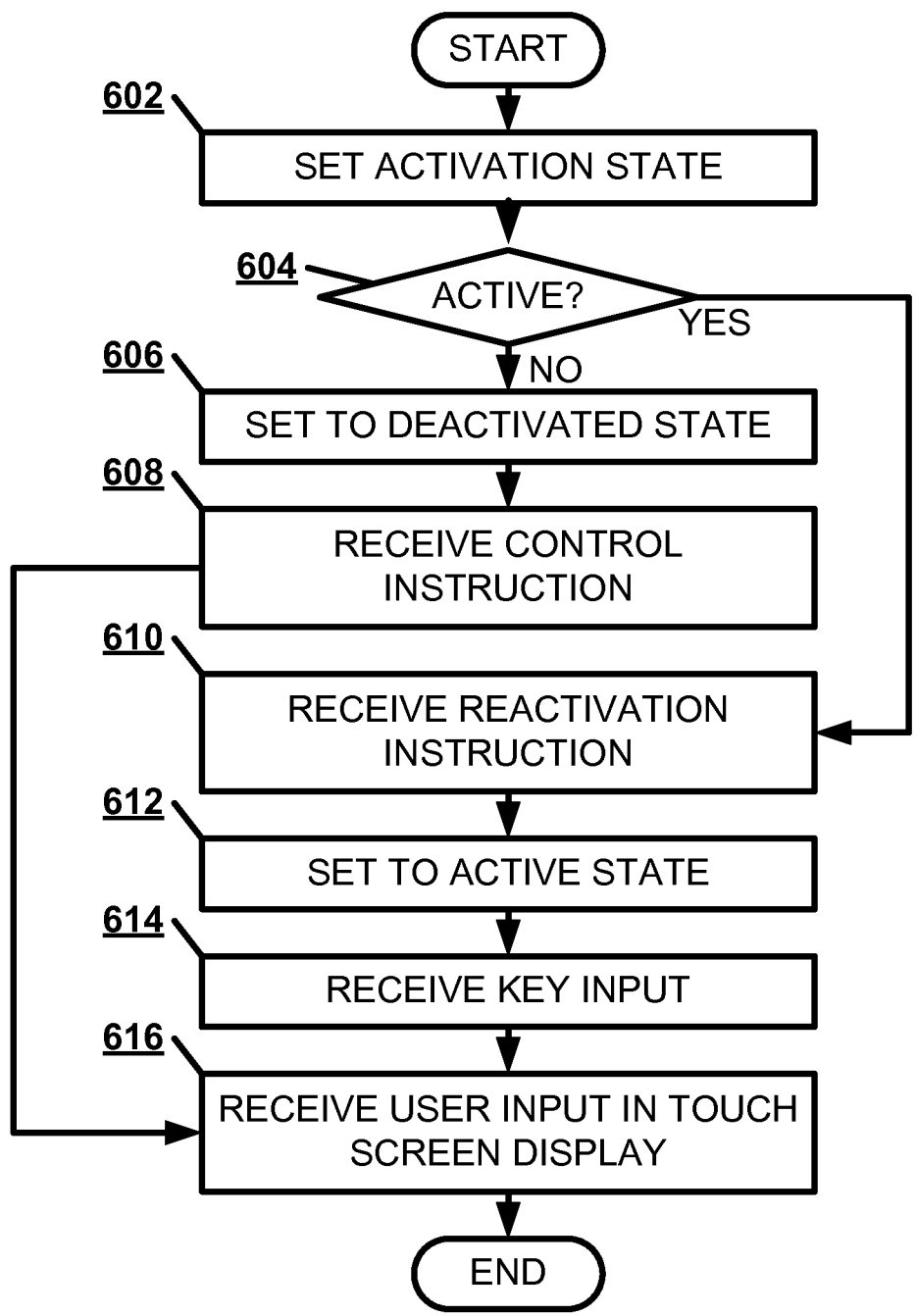
FIG. 6 illustrates, in a flowchart, one embodiment of a method of setting an activation state of a keyboard.

FIG. 6 illustrates, in a flowchart, one embodiment of a method 600 of setting an activation state of a keyboard. The clamshell-slate hybrid 202 may selectively set an activation state of a vestigial key set 426 of a keyboard 424 on a key side 422 of a keyboard chassis 206 hinged along a top axis to a display chassis 204 (Block 602). If the keyboard 424 is deactivated (Block 604), the clamshell-slate hybrid 202 may set the vestigial key set 426 to a deactivated state (Block 606). The clamshell-slate hybrid 202 may receive a control instruction from a dual use key 428 (Block 608).

If the keyboard 424 is activated (Block 604), the clamshell-slate hybrid 202 may receive a reactivation instruction for the vestigial key set 426 (Block 610). The reactivation instruction may be at least one of a user gesture in the touch screen display 354, a biometric identifier of a user, a keystroke input, or a slate mode exit notification. The user gesture may be any gesture made by the user on the touch screen display 354. The biometric identifier may be a fingerprint received via the touch screen display 354. The keystroke input may be a combination of inputs of one or more of the dual use keys. The slate mode exit notification may be generated by the latch sensor 406 or the hinge sensor 514 to indicate that the clamshell-slate hybrid 202 is exiting slate mode 240.

The clamshell-slate hybrid 202 may set the vestigial key set 426 to an active state (Block 612). The clamshell-slate hybrid 202 may receive a key input via the vestigial key set 426 (Block 614). The clamshell-slate hybrid 202 may receive a user input in a touch screen display 354 on a display side 352 of the display chassis 204 (Block 616).

FIG. 7 illustrates, in a flowchart, one embodiment of a method 700 of deactivating a keyboard. The clamshell-slate hybrid 202 may retract the vestigial key set 426 based on an activation state (Block 702). The clamshell-slate hybrid 202 may cover the vestigial key set 426 in the deactivated state (Block 704). The clamshell-slate hybrid 202 may change a function of a dual use key 428 upon disabling the vestigial key set 426 (Block 706). The clamshell-slate hybrid 202 may enable a popup virtual keyboard 356 when the vestigial key set 426 is in the deactivated state (Block 708).

FIG. 8 illustrates, in a flowchart, one embodiment of a method 800 of activating a keyboard. The clamshell-slate hybrid 202 may raise the vestigial key set 426 in an active state (Block 802). The clamshell-slate hybrid 202 may uncover the vestigial key set 426 in the active state (Block 804). The clamshell-slate hybrid 202 may change a function of dual use key 428 upon enabling the vestigial key set 426 (Block 806). The clamshell-slate hybrid 202 may disable a popup virtual keyboard 356 when the vestigial key set 426 is in the active state (Block 808).

Figure 9:
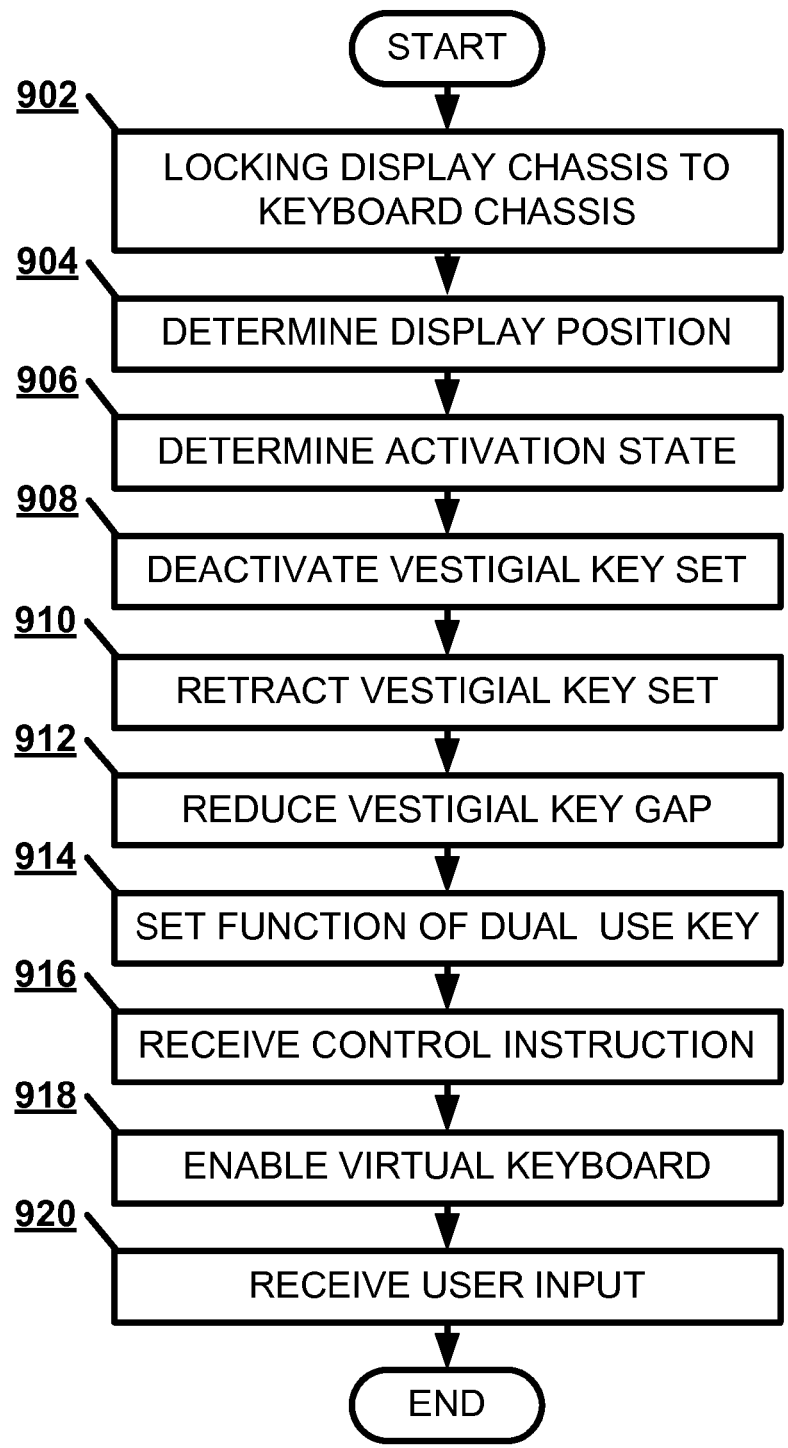
FIG. 9 illustrates, in a flowchart, one embodiment of a method of converting a laptop to a slate.

FIG. 9 illustrates, in a flowchart, one embodiment of a method 900 of converting a laptop to a tablet. The laptop-tablet hybrid may lock a display chassis 204 to a keyboard chassis 206 so that a cover side 302 of the display chassis 204 opposite the display side 352 is facing a base side 402 of the keyboard chassis 206 opposite the key side 422 (Block 902). The laptop-tablet hybrid may determine a display position of the display chassis 204 relative to the keyboard chassis 206 along a top axis (Block 904). The laptop-tablet hybrid may determine an activation state of the vestigial key set 426 using the display position (Block 906). The laptop-tablet hybrid may selectively set the activation state of a vestigial key set 426 of a keyboard 424 on the key side 422 of the keyboard chassis 206 based on the display position. Thus, the laptop-tablet hybrid may deactivate the vestigial key set 426 based on the display position (Block 908). The laptop-tablet hybrid may retract the vestigial key set 426 in a deactivated state (Block 910). The laptop-tablet hybrid may reduce a vestigial key gap upon retraction (Block 912). The laptop-tablet hybrid may selectively set a function of a dual use key 428 of a keyboard 424 on the key side 422 of the keyboard chassis 206 based on the display position (Block 914). The laptop-tablet hybrid may receive a control instruction from the dual use key 428 (Block 916). The laptop-tablet hybrid may enable a popup virtual keyboard when the vestigial key set is in a deactivated state (Block 918). The laptop-tablet hybrid may receive user input in a touch screen display 354 on a display side 352 of the display chassis 206 (Block 920).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A machine-implemented method, comprising:
   detecting that a laptop-slate hybrid is in a slate form factor in which a display chassis of the laptop-slate hybrid is positioned to a keyboard chassis of the laptop-slate hybrid so that a cover side of the display chassis opposite a display side is facing a base side of the keyboard chassis opposite a key side containing a touch pad and a keyboard having a vestigial key set and a dual use key set;
   deactivating the vestigial key set of a keyboard on the key side of a keyboard chassis, the vestigial key set being active with a standard keyboard function in a clamshell form factor; and
   changing the dual use key set of the keyboard from a first the standard keyboard function in the clamshell form factor to a second function in the slate form factor based on a position of the display chassis relative to the keyboard chassis.

2. The method of claim 1, further comprising:
   determining a display position of the display chassis relative to the keyboard chassis.

3. The method of claim 2, further comprising:
   locking the display chassis to the keyboard chassis in the slate form factor with a cover latch.

4. The method of claim 1, further comprising:
   receiving at least one of a user gesture in a touch screen display, a biometric identifier of a user, a keystroke input, and a slate mode exit notification as a reactivation instruction for the vestigial key set.

5. The method of claim 1, further comprising:
   enabling a popup virtual keyboard when the vestigial key set is in a deactivated state.

6. The method of claim 1, further comprising:
   receiving a control instruction from a dual use key of the dual use key set.

7. The method of claim 1, further comprising:
   receiving a user input in a touch screen display on the display side of the display chassis.

8. The method of claim 1, further comprising:
   covering the vestigial key set in a deactivated state.

9. The method of claim 1, further comprising:
   disabling a popup virtual keyboard when the vestigial key set is in an active state.

10. A computing device, comprising:
    a display chassis having a touch screen display on a display side and a cover side opposite the display side;
    a keyboard chassis having a touch pad and a keyboard on a key side and a base side opposite the key side, the keyboard having a dual use key set having a first standard keyboard function in a clamshell form factor to a second function in a slate form factor based on a display position of the display chassis relative to the keyboard chassis and a vestigial key set active with the standard keyboard function in a clamshell form factor; and
    a hinge along a top axis of the keyboard chassis allowing the display side of the display chassis to directly face the key side of the keyboard chassis and the cover side of the display chassis to directly face the base side of the keyboard chassis.

11. The computing device of claim 10, wherein the dual use key set receives a control instruction from a user.

12. The computing device of claim 10, wherein the vestigial key set is set to a deactivated state to avoid accidental user input.

13. The computing device of claim 12, wherein the vestigial key set reactivates in response to at least one of a user gesture in the touch screen display, a biometric identifier of a user, a keystroke input, and a slate mode exit notification.

14. The computing device of claim 12, wherein the touch screen display disables a popup virtual keyboard when the vestigial key set is in an active state.

15. A keyboard chassis, comprising:
a base side opposite a key side;
a keyboard on a key side having a dual use key set having a standard keyboard function in a clamshell form factor to a second function in a slate form factor based on a display position of a display chassis relative to the keyboard chassis and a vestigial key set active with the standard keyboard function in a clamshell form factor;
a touch pad on the key side; and
a hinge along a top axis of the keyboard chassis allowing a display side of the display chassis to directly face the key side of the keyboard chassis in a clamshell form factor and a cover side of the display chassis to directly face the base side of the keyboard chassis in a slate form factor.

16. The keyboard chassis of claim 15, further comprising:
a magnetic cover latch that locks the display chassis to the keyboard chassis so that the cover side directly faces the base side.

17. The keyboard chassis of claim 15, further comprising:
a processor that selectively sets an activation state of the vestigial key set of the keyboard.

18. The keyboard chassis of claim 15, wherein the vestigial key set is set to a deactivated state to avoid accidental user input.

19. The keyboard chassis of claim 15, wherein the dual use key set receives a control instruction from a user.

20. The keyboard chassis of claim 15, wherein the vestigial key set reactivates in response to at least one of a user gesture in a touch screen display, a biometric identifier of a user, a keystroke input, and a slate mode exit notification.

* * * * *